United States Patent
Tian et al.

(10) Patent No.: US 10,891,465 B2
(45) Date of Patent: Jan. 12, 2021

(54) METHODS AND APPARATUSES FOR SEARCHING FOR TARGET PERSON, DEVICES, AND MEDIA

(71) Applicant: SHENZHEN SENSETIME TECHNOLOGY CO., LTD, Shenzhen (CN)

(72) Inventors: Maoqing Tian, Shenzhen (CN); Shuai Yi, Shenzhen (CN); Junjie Yan, Shenzhen (CN)

(73) Assignee: SHENZHEN SENSETIME TECHNOLOGY CO., LTD., Shenzhen (CN)

(*) Notice: Subject to any disclaimer, the term of this patent is extended or adjusted under 35 U.S.C. 154(b) by 62 days.

(21) Appl. No.: 16/457,083

(22) Filed: Jun. 28, 2019

(65) Prior Publication Data
US 2019/0325197 A1    Oct. 24, 2019

Related U.S. Application Data

(63) Continuation of application No. PCT/CN2018/112420, filed on Oct. 29, 2018.

(30) Foreign Application Priority Data

Nov. 28, 2017   (CN) .......................... 2017 1 1219178

(51) Int. Cl.
G06K 9/00    (2006.01)
(52) U.S. Cl.
CPC ..... *G06K 9/00248* (2013.01); *G06K 9/00281* (2013.01); *G06K 9/00744* (2013.01)

(58) Field of Classification Search
CPC ........... G06K 9/00248; G06K 9/00281; G06K 9/00744; G06K 9/00268; G06K 9/6223;
(Continued)

(56) References Cited

U.S. PATENT DOCUMENTS 7,139,411 B2 * 11/2006 Fujimura ........... G06K 9/00362
382/103
8,131,079 B2 * 3/2012 Hayasaka .......... G06K 9/00362
382/181

(Continued)

FOREIGN PATENT DOCUMENTS

CN      1503194 A      6/2004
CN    101996328 A      3/2011
(Continued)

OTHER PUBLICATIONS

International Search Report in the international application No. PCT/CN2018/112420, dated Feb. 13, 2019.
(Continued)

*Primary Examiner* — Sheela C Chawan
(74) *Attorney, Agent, or Firm* — Syncoda LLC; Feng Ma

(57) ABSTRACT

Methods, apparatuses, devices, program products, and media can improve the accuracy rate of searching for a target person. The method includes: obtaining an image of the target person; searching a face image library by using the image of the target person to obtain a first face image template matching the image of the target person, where the face image library includes a plurality of face image templates; and obtaining, according to the first face image template and a pedestrian image library, at least one target pedestrian image template matching the image of the target person, where the pedestrian image library includes a plurality of pedestrian image templates.

20 Claims, 6 Drawing Sheets

(58) Field of Classification Search
CPC ............. G06K 9/6202; G06K 9/00771; G06K 9/00288; G06K 9/00228; G06K 9/00362; G06K 9/6211; G06K 9/6215; G06F 16/5838
USPC ....... 382/100, 104, 115, 118, 103, 181, 224, 382/117, 218, 209; 348/148, 169
See application file for complete search history.

(56) References Cited

U.S. PATENT DOCUMENTS

| | | | |
|---|---|---|---|
| 9,430,708 B2* | 8/2016 | Han | G06K 9/00362 |
| 2005/0105770 A1* | 5/2005 | Sumitomo | G06K 9/48 382/103 |
| 2011/0267463 A1* | 11/2011 | Lee | G06K 9/00228 348/143 |
| 2012/0194680 A1* | 8/2012 | Ishii | G08G 1/166 348/148 |
| 2012/0212615 A1* | 8/2012 | Ishii | G06K 9/00805 348/148 |

FOREIGN PATENT DOCUMENTS

| | | |
|---|---|---|
| CN | 105760832 A | 7/2016 |
| CN | 106874347 A | 6/2017 |
| CN | 106980844 A | 7/2017 |
| CN | 106991395 A | 7/2017 |
| CN | 107341445 A | 11/2017 |
| CN | 108229314 A | 6/2018 |
| JP | 2000030033 A | 1/2000 |
| JP | 2006236260 A | 9/2006 |
| JP | 2006344236 A | 12/2006 |
| JP | 2010204832 A | 9/2010 |
| KR | 20100138155 A | 12/2010 |

OTHER PUBLICATIONS

Second Office Action of the Chinese application No. 2017112191785, dated Sep. 29, 2020.

First Office Action of the Japanese application No. 2019-553914, dated Oct. 20, 2020.

* cited by examiner

METHODS AND APPARATUSES FOR SEARCHING FOR TARGET PERSON, DEVICES, AND MEDIA

CROSS-REFERENCE TO RELATED APPLICATIONS

This is a continuation of International patent application No. PCT/CN2018/112420 filed on Oct. 29, 2018, which claims priority to Chinese Patent Application No. 201711219178.5 filed on Nov. 28, 2017. The disclosures of these applications are incorporated herein by reference in their entirety.

TECHNICAL FIELD

The present disclosure relates to the field of computer vision technologies, and in particular, to methods and apparatuses for searching for a target person, electronic devices, computer program products, and storage media.

BACKGROUND

At present, search solutions for a target person generally search a pre-established image library for a person image which is same as or similar to an image of the target person, and the found person image is used as a search result of the target person. How to ensure a high recall rate and accuracy rate is a research focus in this field.

SUMMARY

Embodiments of the present disclosure provide technical solutions for searching for a target person.

According to one aspect of the embodiments of the present disclosure, provided is a method for searching for a target person, including: obtaining an image of the target person; searching a face image library by using the image of the target person to obtain a first face image template matching the image of the target person, where the face image library includes a plurality of face image templates; and obtaining, according to the first face image template and a pedestrian image library, at least one target pedestrian image template matching the image of the target person, where the pedestrian image library includes a plurality of pedestrian image templates.

According to another aspect of the embodiments of the present disclosure, provided is an apparatus for searching for a target person, including: a processor; and a memory for storing instructions executable by the processor, where execution of the instructions by the processor causes the processor to implement operations, the operations comprising: obtaining an image of the target person; searching a face image library by using the image of the target person to obtain a first face image template matching the image of the target person, where the face image library includes a plurality of face image templates; and obtaining, according to the first face image template and a pedestrian image library, at least one target pedestrian image template matching the image of the target person, where the pedestrian image library includes a plurality of pedestrian image templates.

According to yet another aspect of the embodiments of the present disclosure, provided is a non-transitory computer storage medium, where the computer storage medium stores computer-readable instructions, and when the instructions are executed, the method for searching for a target person in any of the foregoing possible implementations is implemented.

Based on the methods and apparatuses for searching for a target person, electronic devices, computer program products, and storage media provided in the embodiments of the present disclosure, a conjunction search strategy combining face search and pedestrian search is used, a face image library is first searched to obtain a first face image template matching an image of the target person, and then at least one target pedestrian image template matching the image of the target person is obtained based on a pedestrian image library and the first face image template, thereby improving the accuracy rate of searching for a target person.

The following further describes in detail the technical solutions of the present disclosure with reference to the accompanying drawings and embodiments.

BRIEF DESCRIPTION OF THE DRAWINGS

The accompanying drawings constituting a part of the specification describe the embodiments of the present disclosure and are intended to explain the principles of the present disclosure together with the descriptions.

According to the following detailed descriptions, the present disclosure can be understood more clearly with reference to the accompanying drawings.

DETAILED DESCRIPTION

Figure 1:
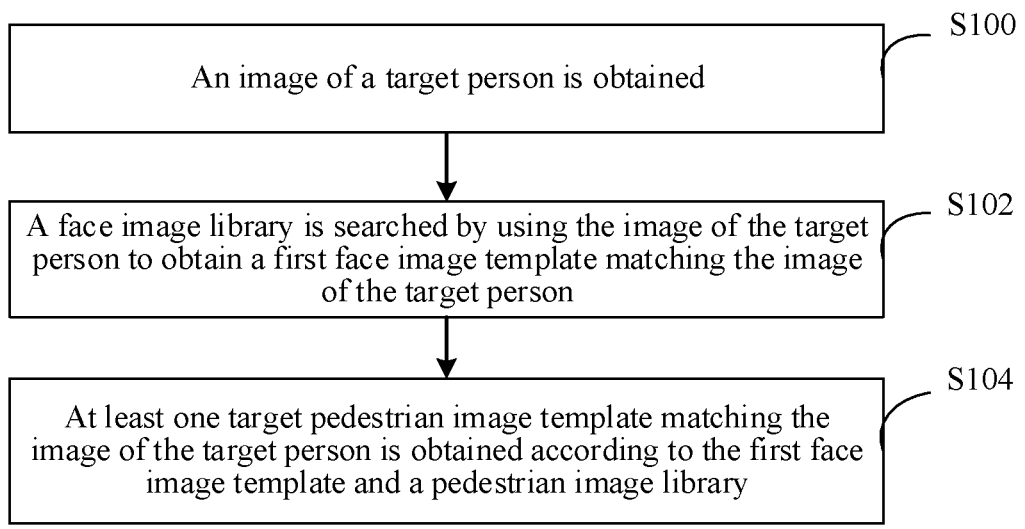
FIG. 1 is a flowchart of a method for searching for a target person according to some embodiments of the present disclosure.

Various exemplary embodiments of the present disclosure are now described in detail with reference to the accompanying drawings. It should be noted that, unless otherwise stated specifically, relative arrangement of the components and steps, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to electronic devices such as terminal devices, computer systems, and servers, which may operate with numerous other general-purpose or special-purpose computing system environments or configurations. Examples of well-known terminal devices, computing systems, environments, and/or configurations suitable for use together with the electronic devices such as terminal devices, computer systems, and servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The electronic devices such as terminal devices, computer systems, and servers may be described in the general context of computer system executable instructions (for example, program modules) executed by the computer systems. Generally, the program modules may include routines, programs, target programs, components, logics, data structures, and the like, to perform specific tasks or implement specific abstract data types. The computer system/server may be practiced in the distributed cloud computing environments in which tasks are performed by remote processing devices that are linked through a communications network. In the distributed computing environments, program modules may be located in local or remote computing system storage media including storage devices.

FIG. 1 is a flowchart of a method for searching for a target person according to some embodiments of the present disclosure.

In S100, an image of the target person is obtained.

In the embodiments of the present disclosure, the image of the target person refers to an image including at least part of the target person, for example, a face image of the target person, including a static image of a face or a video frame image in a video including a face. For example, the image of the target person is a video frame image, such as an image frame in a video sequence from an image acquisition device, or is a separate frame of image or a separate image, or is from other devices. The embodiments of the present disclosure do not limit specific implementations of the attributes, source, and obtaining ways of the image of the target person.

In an example, the operation of S100 is performed by a processor by invoking a corresponding instruction stored in a memory, or is performed by an obtaining module 400 run by the processor.

In S102, a face image library is searched by using the image of the target person to obtain a first face image template matching the image of the target person.

In the embodiments of the present disclosure, the face image library is a pre-established image library for storing face image templates. The face image library includes face image templates of one or more persons, and each person corresponds to one or more face image templates.

According to one or more embodiments of the disclosure, the face image template includes a face image and/or information of a face image. The information of the face image includes feature data of the person image, the feature data of the face image includes, for example, at least one feature vector, at least one feature map, or other forms. No limitation is made thereto in the embodiments of the present disclosure. Alternatively, the information of the face image further includes information of a video to which the face image belongs, frame number information of the face image, position information of the face image in a video image, information of a face track to which the face image belongs, or the like. No limitation is made thereto in the embodiments of the present disclosure.

According to one or more embodiments of the disclosure, the face image templates included in the face image library are obtained by performing face detection processing on video images in one or more videos, or the face image templates included in the face image library are obtained by performing face detection processing on static images. The embodiments of the present disclosure do not limit the sources of the face image templates included in the face image library.

According to one or more embodiments of the disclosure, the number of the first face image template is one or more. That is to say, the face image library is searched by using the image of the target person to obtain at least one first face image template matching the image of the target person.

For example, the face image templates of a plurality of persons are stored in a face image library L, the face image template of each person is one or more, and the face image library L is searched for first face image templates 11, 12, and 13 matching the image P of the target person. The first face image templates 11, 12, and 13 are face image templates corresponding to a same person as the image P of the target person.

In an example, the operation of S102 is performed by a processor by invoking a corresponding instruction stored in a memory, or is performed by a face search module 401 run by the processor.

In S104, at least one target pedestrian image template matching the image of the target person is obtained according to the first face image template and a pedestrian image library.

In the embodiments of the present disclosure, the pedestrian image library is a pre-established image library for storing pedestrian image templates. The pedestrian image library includes pedestrian image templates of one or more persons, and each person corresponds to one or more pedestrian image templates.

According to one or more embodiments of the disclosure, the pedestrian image template includes a pedestrian image and/or information of a pedestrian image. The information of the pedestrian image includes feature data of the pedestrian image, the feature data of the pedestrian image includes, for example, at least one feature vector, at least one feature map, or other forms. No limitation is made thereto in the embodiments of the present disclosure. Alternatively, the information of the pedestrian image further includes information of a video to which the pedestrian image belongs, frame number information of the pedestrian image, position information of the pedestrian image in a video image, information of a pedestrian track to which the pedestrian image belongs, and the like. No limitation is made thereto in the embodiments of the present disclosure.

According to one or more embodiments of the disclosure, the pedestrian image templates included in the pedestrian image library are obtained by performing pedestrian detection processing on video images in one or more videos, where the video sources of the pedestrian image templates in the pedestrian image library completely overlap, partially overlap, or do not overlap the video sources of the face image templates in the face image library, or the pedestrian image templates in the pedestrian image library are obtained by performing pedestrian detection processing on static images. The embodiments of the present disclosure do not limit the sources of the pedestrian image templates included in the pedestrian image library.

According to one or more embodiments of the disclosure, at least one target pedestrian image template is obtained according to each first pedestrian image template and the pedestrian image library. The target pedestrian image template is obtained by searching the pedestrian image library. However, no limitation is made thereto in the embodiments of the present disclosure.

For example, the pedestrian image templates of one or more persons are stored in a pedestrian image library X, the number of the pedestrian image template of each person may be greater than one, pedestrian image templates x1 and x2 matching the image P of the target person are obtained according to the pedestrian image library X and the first face image template 11, a pedestrian image template x3 matching the image P of the target person is obtained according to the pedestrian image library X and the first face image template 12, and pedestrian image templates x4 and x5 matching the image P of the target person are obtained according to the pedestrian image library X and the first pedestrian image template 13. In this way, five target pedestrian image templates x1-x5 matching the image of the target person are obtained.

In an example, the operation of S104 is performed by a processor by invoking a corresponding instruction stored in a memory, or is performed by a pedestrian search module 402 run by the processor.

In the embodiments of the present disclosure, the operation of S102 is considered to be a face search process, and the operation of S104 is considered to be a pedestrian search process.

Generally, the face of a same person does not change over time, and the time span applicable to face search is very long, and can reach months or even years. However, during pedestrian search, information such as the clothes and backpacks of pedestrians is more concerned, and therefore, the time span applicable to pedestrian search is often only a few hours or at most a day or two. Moreover, after the number of the face image templates in the face image library and the number of the pedestrian image templates in the pedestrian image library reach a certain level (such as 100,000 or 1,000,000), the precision of face search is far greater than that of pedestrian search. However, in intelligent video monitoring applications, desired search results are all search results corresponding to the image of the target person. However, only a face image can be obtained by face search (considering the case that the face of a person with his back facing a camera is not photographed), and therefore, the recall rate of face search is lower than that of pedestrian search in the intelligent video monitoring applications. The recall rate is also referred to as recall ratio, and is used for measuring a desired proportion of cases where targets are found in the search results.

According to the method provided in the embodiments of the present disclosure, a conjunction search strategy combining face search and pedestrian search is used, a face image library is first searched to obtain a first face image template matching an image of a target person, and then at least one target pedestrian image template matching the image of the target person is obtained based on a pedestrian image library and the first face image template, so that the advantages of not only a long time span and high precision of face search but also a high recall rate of pedestrian search are provided, thereby improving the accuracy rate of searching for a target person.

Figure 2:
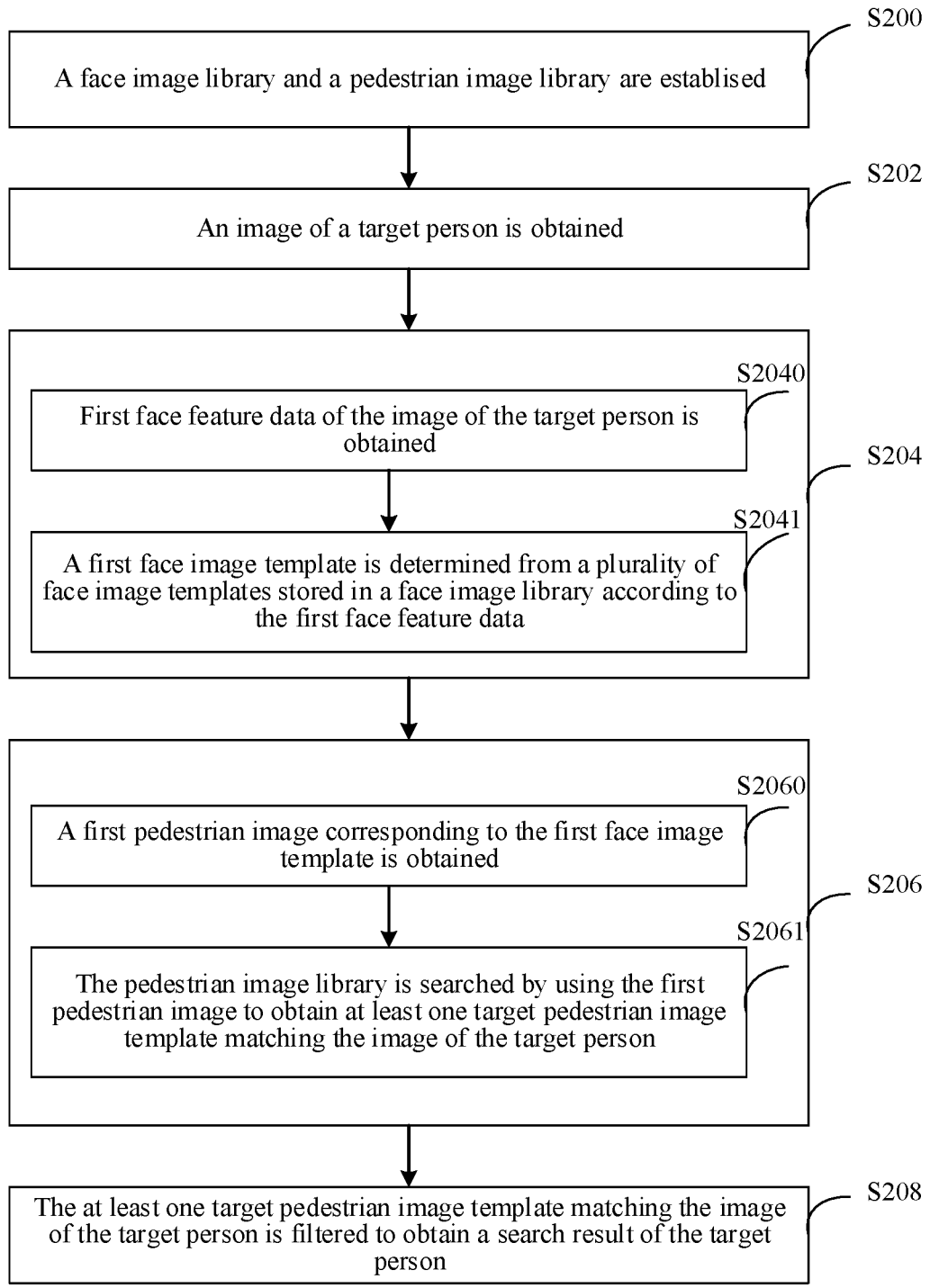
FIG. 2 is a flowchart of a method for searching for a target person according to some other embodiments of the present disclosure.

FIG. 2 is a flowchart of a method for searching for a target person according to some other embodiments of the present disclosure.

In S200, a face image library and a pedestrian image library are established.

In the embodiments of the present disclosure, the establishment processes of the face image library and the pedestrian image library are independent of each other and do not interfere with each other, and are performed concurrently or performed in any order. No limitation is made thereto in the embodiments of the present disclosure. The following separately introduces the establishment processes of the face image library and the pedestrian image library.

(I) Establishment of the Face Image Library

1) Face Detection Processing

Face detection processing is performed on video images included in each of at least one video to obtain a plurality of face images, and each of the plurality of face images and/or information of each face image is stored in a face image library as a face image template.

In some possible implementations, the information of the face image includes at least one of the following: feature data of the face image, information of a video to which the face image belongs, frame number information of the face image, position information of the face image in a video image (i.e., image position information of the face image), or the like.

The frame number information of the face image indicates a video image to which the face image belongs, or the video image to which the face image belongs is indicated by other information. According to one or more embodiments of the disclosure, the position information of the face image in the video image indicates the position of the face image in the video image. For example, the position information of the face image in the video image includes position information of a bounding box of the face image in the video image. In some other possible implementations, the information of the face image further includes other information. No limitation is made thereto in the embodiments of the present disclosure.

For example, framing process is performed to a video Si to obtain two frames of video images Y1 and Y2. Then, face detection processing is performed on the video images Y1 and Y2, respectively, face images y1, y2, and y3 are obtained from the video image Y1, face images y4 and y5 are obtained from the video image Y2, and information of each face image is obtained. For example, the information of the face image y1 includes: information of video image Y1 (such as the name, frame number, occupation space, and duration of the video image Y1), position information of the face image y1 in the video image Y1, or the like. The information of the face images y2, y3, y4, and y5 is similar to that of the face image y1, and details are not described herein repeatedly. At last, the face images y1, y2, y3, y4, and y5 and/or respective information thereof are stored in a face image library L as face image templates.

2) Face Tracking Processing

Face tracking processing is performed on face images in a plurality of video frame images obtained by the foregoing face detection processing to obtain at least one face track, where each face track includes at least two of a plurality of face images.

The at least two face images included in the face track correspond to a same person.

In some possible implementations, information for indicating correspondences between the plurality of face images and the at least one face track is stored in the face image library. For example, the face image template corresponding to the face image includes identification information of a face track to which the face image belongs. For another example, the face image library includes identification information of the face track and identification information of the face image templates corresponding to the at least two face images included in the face track, and the like. However, the embodiments of the present disclosure are not limited thereto.

In some examples, information of each of the at least one face track is stored in the face image library.

According to one or more embodiments of the disclosure, the information of the face track includes identification information of the face image templates corresponding to the face images included in the face track and/or feature data corresponding to the face track, and the like.

According to one or more embodiments of the disclosure, average feature data of each face track of the at least one face track is determined according to the at least two face images included in the each face track, and the average feature data of each of the at least one face track is stored in the face image library. In some implementations, the feature data of the face image templates corresponding to the at least two face images included in the face track is average feature data of the face track. In some other implementations, the feature data of the face image templates corresponding to the face images included in the face track is obtained by performing feature extraction on the face images. No limitation is made thereto in the embodiments of the present disclosure.

For example, face tracking processing is performed on face images y1, y2, y3, y4, and y5 to obtain face tracks g1 and g2, where the face track g1 includes the face images y1, y3 and y5, and the face track g2 includes the face images y2 and y4. Feature data of the face images y1, y3, and y5 is separately extracted, and the average processing result of the feature data of the face images y1, y3, and y5 is used as average feature data gt1 of the face track g1, where the average processing is arithmetic average, geometric average, weighted average, or the like, and no limitation is made thereto in the embodiments of the present disclosure. In addition, feature data of the face images y2 and y4 is separately extracted, and the average processing result of the feature data of the face images y2 and y4 is used as average feature data gt2 of the face track g2. At last, the average feature data gt1 of the face track g1 and the average feature data gt2 of the face track g2 are stored in the face image library L. Specifically, the average feature data gt1 of the face track g1 is stored in the face image library L as feature data of face image templates corresponding to the face images y1, y3, and y5, and the average feature data gt2 of the face track g2 is stored in the face image library L as feature data of face image templates corresponding to the face images y2 and y4. Alternatively, the face image library L stores the feature data of each of the face images y1, y3, and y5 and the average feature data gt1 of the face track g1.

It should be understood that, in the foregoing examples, the average processing result of the feature data of the plurality of face images included in the face track is used as the average feature data of the face track. In the embodiments of the present disclosure, the average feature data of the face track is obtained by performing one or more processing on the feature data of the at least two face images included in the face track. The embodiments of the present disclosure do not limit specific implementations of the processing.

In some possible implementations, information of a face track to which a face image belongs as information of a face image template corresponding to the face image is stored in the face image library. For example, the information of the face image template includes identification information and/or average feature data of the face track to which the face image belongs. No limitation is made thereto in the embodiments of the present disclosure.

According to one or more embodiments of the disclosure, in the process of establishing the face image library, a neural network model or the like is used for performing face detection processing and face tracking processing. The embodiments of the present disclosure do not limit technical means used for the face detection processing and the face tracking processing.

(II) Establishment of the Pedestrian Image Library

1) Pedestrian Detection Processing

Face detection processing is performed on video images included in each of at least one video to obtain a plurality of pedestrian images, and each of the plurality of pedestrian images and/or information of each pedestrian image is stored in a pedestrian image library as a pedestrian image template.

In some possible implementations, the information of the pedestrian image includes at least one of the following: feature data of the pedestrian image, information of a video to which the pedestrian image belongs, frame number information of the pedestrian image, position information of the pedestrian image in a video image, or the like.

The frame number information of the pedestrian image indicates a video image to which the pedestrian image belongs, or the video image to which the pedestrian image belongs is indicated by other information. According to one or more embodiments of the disclosure, the position information of the pedestrian image in the video image indicates the position of the pedestrian image in the video image. For example, the position information of the pedestrian image in the video image includes position information of a bounding box of the pedestrian image in the video image. In some other possible implementations, the information of the pedestrian image further includes other information. No limitation is made thereto in the embodiments of the present disclosure.

The pedestrian detection process may be performed with reference to the face detection process, and details are not described herein repeatedly.

2) Pedestrian Tracking Processing

Pedestrian tracking processing is performed on pedestrian images in a plurality of video frame images obtained by the foregoing pedestrian detection processing to obtain at least one pedestrian track, where each pedestrian track includes at least two of a plurality of pedestrian images.

The at least two pedestrian images included in the pedestrian track correspond to a same person.

In some possible implementations, information for indicating correspondences between the plurality of pedestrian images and the at least one pedestrian track is stored in the pedestrian image library. For example, the pedestrian image template corresponding to the pedestrian image includes identification information of a pedestrian track to which the pedestrian image belongs. For another example, the pedestrian image library includes identification information of the pedestrian track and identification information of the pedestrian image templates corresponding to the at least two pedestrian images included in the pedestrian track, and the like. However, the embodiments of the present disclosure are not limited thereto.

In some examples, information of each of the at least one pedestrian track is stored in the pedestrian image library.

According to one or more embodiments of the disclosure, the information of the pedestrian track includes identification information of the pedestrian image templates corresponding to the pedestrian images included in the pedestrian track and/or feature data corresponding to the pedestrian track, and the like.

The feature data corresponding to the pedestrian track is obtained based on feature data extracted from the at least two pedestrian images included in the pedestrian track. In some embodiments, average feature data of the pedestrian track is determined according to the at least two pedestrian images included in the pedestrian track, and the average feature data of the pedestrian track is stored in the pedestrian image library. Specifically, the feature data corresponding to the pedestrian track is obtained by performing average processing on the feature data extracted from the at least two pedestrian images included in the pedestrian track, where the average processing is, for example, mathematical average, geometric average, weighted average, or the like. In some implementations, the feature data of the pedestrian image templates corresponding to the at least two pedestrian images included in the pedestrian track is average feature data of the pedestrian track. In some other implementations, the feature data of the pedestrian image templates corresponding to the pedestrian images included in the pedestrian track is obtained by performing feature extraction on the pedestrian images. No limitation is made thereto in the embodiments of the present disclosure.

It should be understood that, in the foregoing examples, the average processing result of the feature data of the plurality of pedestrian images included in the pedestrian track is used as the average feature data of the pedestrian track. In the embodiments of the present disclosure, the average feature data of the pedestrian track is obtained by performing one or more processing on the feature data of the at least two pedestrian images included in the pedestrian track. The embodiments of the present disclosure do not limit specific implementations of the processing.

In some possible implementations, information of a pedestrian track to which a pedestrian image belongs as information of a pedestrian image template corresponding to the pedestrian image is stored in the pedestrian image library. For example, the information of the pedestrian image template includes identification information and/or average feature data of the pedestrian track to which the pedestrian image belongs. No limitation is made thereto in the embodiments of the present disclosure.

According to one or more embodiments of the disclosure, in the process of establishing the pedestrian image library, means such as a neural network model or other machine learning algorithms is used for performing pedestrian detection processing and pedestrian tracking processing. The embodiments of the present disclosure do not limit technical means used for the pedestrian detection processing and the pedestrian tracking processing.

The pedestrian tracking process may be performed with reference to the face tracking process, and details are not described herein repeatedly.

In some possible implementations, performing face/pedestrian detection processing on video images in a video sequence refers to analyzing each frame of image in a video by using a face/pedestrian detection algorithm to obtain a face/pedestrian included in each frame of image, or based on a key frame technology, performing face/pedestrian detection processing on only key frames in a video sequence, while using a tracking technology for non-key frames. However, no limitation is made thereto in the embodiments of the present disclosure.

In an example, S200 is performed by a processor by invoking a corresponding instruction stored in a memory, or is performed by a face detection module 504, a face tracking module 505, a pedestrian detection module 506, and a pedestrian tracking module 507 run by the processor.

In S202, an image of the target person is obtained.

In an example, the operation of S202 is performed by a processor by invoking a corresponding instruction stored in a memory, or is performed by an obtaining module 500 run by the processor.

In S204, a face image library is searched by using the image of the target person to obtain a first face image template matching the image of the target person.

In some possible implementations, S204 includes the following steps.

In S2040, first face feature data of the image of the target person is obtained.

In the embodiments of the present disclosure, feature data of the image of the target person is referred to as the first face feature data. According to one or more embodiments of the disclosure, the first face feature data of the image of the target person is extracted via a face recognition neural network, or the feature data of the image of the target person is obtained by using a machine learning algorithm or other means. For example, feature extraction is performed on the image of the target person via the face recognition neural network to obtain first face feature data, where the first face feature data is a 256-dimensional or 512-dimensional vector or graph, or other dimensional vector, matrix, graph, or tensor, and the number of dimensions depends on the implementation of the face recognition neural network. A value in each dimension of the first face feature data is a real number within a range from −10 to 10, and if the first face feature data is normalized, the value in each dimension is within a range from −1 to 1. However, the embodiments of the present disclosure are not limited thereto.

In some other examples, the first face feature data is obtained from other devices. For example, a server receives first face feature data of a target person sent by a terminal device. However, the embodiments of the present disclosure are not limited thereto.

In S2041, according to the first face feature data, a first face image template is determined from a plurality of face image templates stored in a face image library.

According to one or more embodiments of the disclosure, a face image template, which corresponds to second face feature data with a distance satisfying a preset condition from the first face feature data among a plurality of pieces of face feature data, is determined as a first face image template. In some possible implementations, the first face image template is determined from a plurality of face image templates based on a distance between the first face feature data and each of a plurality of pieces of second face feature data corresponding to the plurality of face image templates (such as cosine distance and Euclidean distance). In one example, at least one face image template, which corresponds to second face feature data with a minimum distance from the first face feature data among the plurality of pieces of second face feature data, is determined as the first face image template. In another example, at least one face image template, which corresponds to second face feature data with a distance less than or equal to a first threshold from the first face feature data among the plurality of pieces of second face feature data, is determined as the first face image template, where the first threshold is set according to actual requirements. The present disclosure does not limit the implementation thereof.

Herein, feature data of the face image templates in the face image library is referred to as the second face feature data. According to one or more embodiments of the disclosure, each of the plurality of face image templates includes corresponding second face feature data, where According to one or more embodiments of the disclosure, the second face feature data corresponding to the face image templates is feature data extracted from face images corresponding to the face image templates, or is obtained based on feature data extracted from one or more face images in a person or person track corresponding to the face image templates. No limitation is made thereto in the embodiments of the present disclosure. The second face feature data corresponding to different face image templates in the plurality of face image templates is the same or different. According to one or more embodiments of the disclosure, at least two face image templates corresponding to a same person track in the plurality of face image templates include same second face feature data. For example, the second face feature data of the at least two face image templates are average feature data of the face track to which the at least two face image templates belong. However, the embodiments of the present disclosure are not limited thereto.

For example, face image templates y1, y3, and y5 in face image templates y1, y2, y3, y4, and y5 belong to a face track g1, face image templates y2 and y4 do not belong to any face track, then second face feature data corresponding to the face image template y1, second face feature data corresponding to the face image template y3, and second face feature data corresponding to the face image template y5 are all average feature data gt1 of a face track g1, and second face feature data of the face image template y2 is feature data of the face image template y2.

In an example, the operation of S204 is performed by a processor by invoking a corresponding instruction stored in a memory, or is performed by a face search module 501 run by the processor.

In S206, at least one target pedestrian image template matching the image of the target person is obtained according to the first face image template and a pedestrian image library.

According to one or more embodiments of the disclosure, the operation of S206 includes the following steps.

In S2060, a first pedestrian image corresponding to the first face image template is obtained.

In the embodiments of the present disclosure, the first face image template corresponds to a first face image, information of the first face image template is obtained from the face image template, for example, information of the first face image corresponding to the first face image template, and a first pedestrian image corresponding to the first face image template is obtained according to the obtained information. According to one or more embodiments of the disclosure, the information of the first face image includes information of a video to which the first face image belongs and/or frame number information of the first face image, or further includes image position information of the first face image. In some examples, a first video to which the first face image belongs as well as frame number information and image position information of the first face image are determined, and a first pedestrian image corresponding to the first face image template from the first video is obtained according to the frame number information and the image position information of the first face image.

The frame number information of the first face image indicates a frame in the first video where the first face image is located, and a first video image in the first video including the first face image is obtained according to the frame number information of the first face image, where the frame in the first video where the first video image is located corresponds to the frame number information of the first face image.

The image position information of the first face image indicates a position of the first face image in the video image, for example, coordinate information of a bounding box of the first face image in the first video image. However, the embodiments of the present disclosure are not limited thereto.

According to one or more embodiments of the disclosure, the process of obtaining the first pedestrian image is performed in the following two cases.

In case I, if the first video includes a pedestrian image which has a frame number corresponding to the frame number information of the first face image and includes the first face image, the pedestrian image including the first face image is determined as the first pedestrian image corresponding to the first face image template.

For example, a first face image 11 is in the $10^{th}$ frame of video image of a first video M1, a pedestrian image x1 completely including the first face image 11 exists in the $10^{th}$ frame of video image of the first video M1, and then the pedestrian image x1 is determined as a first pedestrian image corresponding to the first face image 11.

In case II, if the first video does not include a pedestrian image which has a frame number corresponding to the frame number information of the first face image and includes the first face image, the first face image is expanded in the first video image with a preset proportion to obtain the first pedestrian image corresponding to the first face image template, where the frame number of the first video image in the first video corresponds to the frame number information of the first face image.

For example, a first face image 12 is in the $13^{th}$ frame of video image of a first video M2, no pedestrian image completely including the first face image 12 exists in the $13^{th}$ frame of video image of the first video M2, then the first face image 12 is expanded in the first video image, i.e., the $13^{th}$ frame of video image with a preset proportion (such as four or eight times), and the expanded region is determined as the first pedestrian image corresponding to the first face image 12.

In S2061, the pedestrian image library is searched by using the first pedestrian image for at least one target pedestrian image template matching the image of the target person.

In some implementations of the embodiments of the present disclosure, first pedestrian feature data of the first pedestrian image is determined, and according to the first pedestrian feature data, at least one pedestrian image template matching the first pedestrian image is determined from the plurality of pedestrian image templates stored in the pedestrian image library.

Herein, feature data of the first pedestrian image is referred to as the first pedestrian feature data. According to one or more embodiments of the disclosure, when at least one pedestrian image template matching the first pedestrian image is determined from the plurality of pedestrian image templates stored in the pedestrian image library, at least one pedestrian image template matching the first pedestrian image is determined from the plurality of pedestrian image templates based on a distance between the first pedestrian feature data and each of a plurality of pieces of second pedestrian feature data corresponding to the plurality of pedestrian image templates. Specifically, a pedestrian image template, which corresponds to second pedestrian feature data with a distance satisfying a preset condition from the first pedestrian feature among the plurality of pieces of pedestrian feature data, is determined as the pedestrian image template matching the first pedestrian image. In one example, at least one pedestrian image template, which corresponds to second pedestrian feature data with a minimum distance from the first pedestrian feature data among the plurality of pieces of second pedestrian feature data, is determined as the at least one pedestrian image template matching the first pedestrian image. In another example, at least one pedestrian image template, which corresponds to second pedestrian feature data with a distance less than or equal to a second threshold from the first pedestrian feature data among the plurality of pieces of second pedestrian feature data, is determined as the at least one pedestrian image template matching the first pedestrian image, where the second threshold is set according to actual requirements. The present disclosure does not limit the implementation thereof.

According to one or more embodiments of the disclosure, each of the plurality of pedestrian image templates includes corresponding second pedestrian feature data, where According to one or more embodiments of the disclosure, the second pedestrian feature data corresponding to the pedestrian image templates is feature data extracted from pedestrian images corresponding to the pedestrian image templates, or is obtained based on feature data extracted from one or more pedestrian images in a person or person track corresponding to the pedestrian image templates. No limitation is made thereto in the embodiments of the present disclosure. The second pedestrian feature data corresponding to different pedestrian image templates in the plurality of pedestrian image templates is the same or different. According to one or more embodiments of the disclosure, at least two pedestrian image templates corresponding to a same person track in the plurality of pedestrian image templates include same second pedestrian feature data. For example, the second pedestrian feature data of the at least two pedestrian image templates is average feature data of the pedestrian track to which the at least two pedestrian image templates belong. However, the embodiments of the present disclosure are not limited thereto.

In some possible implementations, the at least one pedestrian image template matching the first pedestrian image is determined as the target pedestrian image template matching the image of the target person.

In some other possible implementations, S206 further includes: filtering the at least one pedestrian image template matching the first pedestrian image to obtain at least one target pedestrian image template matching the image of the target person.

In the embodiments of the present disclosure, the at least one target pedestrian image template matching the image of the target person is determined as a search result of the target person. Alternatively, the at least one target pedestrian image template matching the image of the target person is first determined, and then the at least one target pedestrian image template matching the image of the target person is filtered to obtain a search result of the target person. No limitation is made thereto in the embodiments of the present disclosure.

In an example, the operation of S206 is performed by a processor by invoking a corresponding instruction stored in a memory, or is performed by a pedestrian search module 502 run by the processor.

In S208, the at least one target pedestrian image template matching the image of the target person is filtered to obtain a search result of the target person.

According to one or more embodiments of the disclosure, the operation of S208 is implemented in at least one of the following two ways.

1) The at least one target pedestrian image template matching the image of the target person is filtered according to at least one of time filtering conditions and video filtering conditions.

In some possible implementations, the filtering conditions are manually set. For example, the at least one target pedestrian image template matching the image of the target person is filtered according to the time filtering conditions (such as within a time period of a day) and the video filtering conditions (such as from which monitoring device).

In the embodiments of the present disclosure, the filtering conditions includes, but are not limited to, the time filtering conditions and the video filtering conditions, and further include person filtering conditions, such as gender and age. No limitation is made thereto in the embodiments of the present disclosure.

2) Feature data of the at least one target pedestrian image template matching the image of the target person is clustered, and filtering is performed according to a clustering result.

According to one or more embodiments of the disclosure, the at least one target pedestrian image template is divided into at least one group of pedestrian image templates according to feature data of each of the at least one target pedestrian image template matching the image of the target person; filtering statistics data of each group of pedestrian image templates is determined according to feature data of pedestrian image templates included in each of the at least one group of pedestrian image templates; and a pedestrian image corresponding to one or more of the at least one group of pedestrian image templates is determined as a search result of the target person according to the filtering statistics data of each of the at least one group of pedestrian image templates.

In some possible implementations, filtering statistics data of one group of pedestrian image templates includes an average value or mean squared error of feature data of at least one pedestrian image included in the group of pedestrian image templates. However, the embodiments of the present disclosure are not limited thereto.

In some possible implementations, the at least one target pedestrian image template is arranged in order according to the filtering statistics data of each group of pedestrian image templates, one or more groups of pedestrian image templates ranked first or last are deleted to obtain a search result of the target person.

In some possible implementations, feature data of the at least one target pedestrian image template matching the image of the target person is clustered by using a k-means clustering algorithm to obtain k groups of feature data, for the feature data in each group, the number of tracks corresponding thereto and filtering statistics data such as the variance of the feature data are calculated, and which groups are noise groups are determined according to the filtering statistics data (such as the group with a maximum variance is a noise group). For example, it is assumed that the at least one target pedestrian image template matching the image of the target person is 100 pedestrian tracks, each pedestrian track includes several pedestrian persons, then feature data of the 100 pedestrian tracks is divided into 10 groups by means of the k-means clustering algorithm, According to one or more embodiments of the disclosure, multiple iterative k-means clustering operations are performed on 100 pieces of feature data of the 100 pedestrian tracks, the feature data is divided into 10 groups, where the numbers of pedestrian tracks included in the groups are the same or different, where there are only five pedestrian tracks in the $10^{th}$ group, and the variance of the feature data is the maximum, then the five pedestrian tracks in the $10^{th}$ group are determined to be noises, and pedestrian images included in the five pedestrian tracks in the $10^{th}$ group are removed from the results, and the remaining result is the search result.

In an example, the operation of S208 is performed by a processor by invoking a corresponding instruction stored in a memory, or is performed by a filtering module 503 run by the processor.

Figure 3:
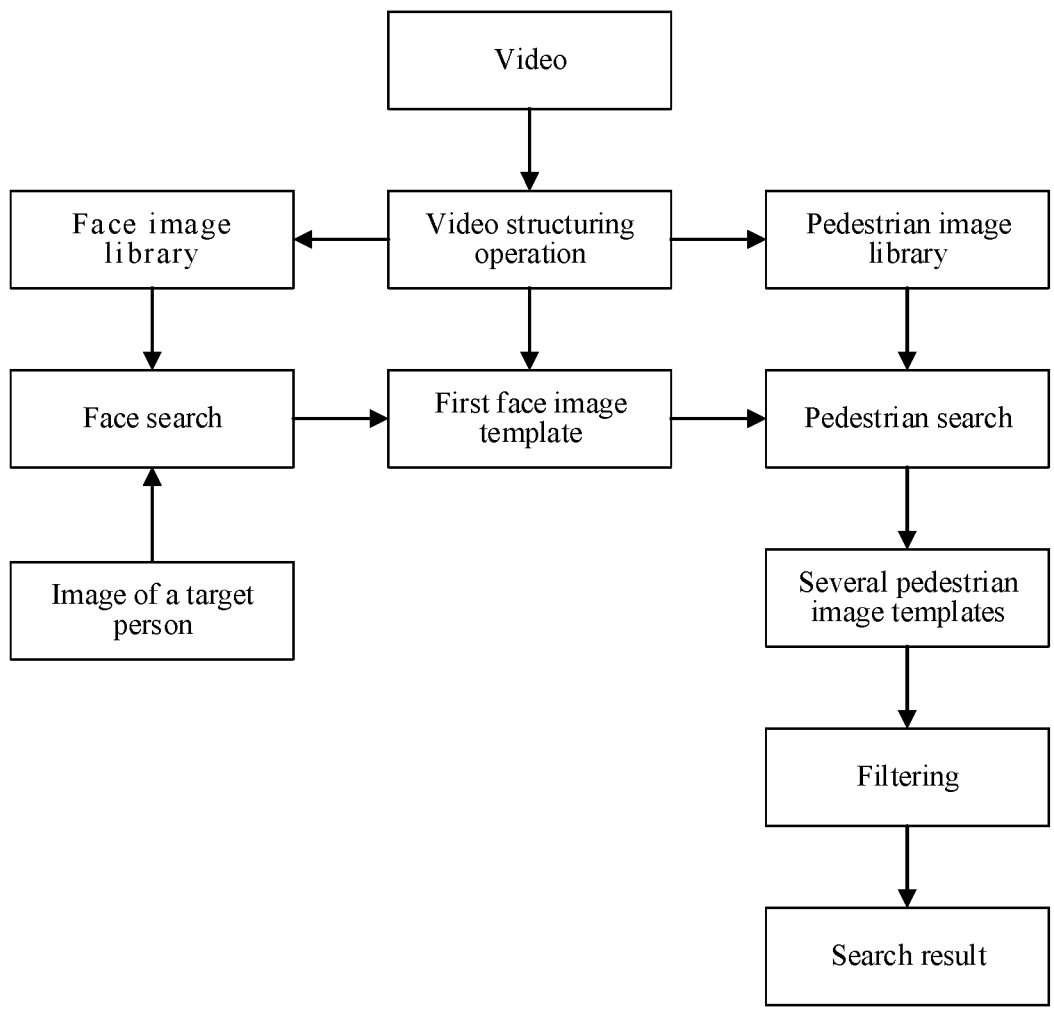
FIG. 3 is a logic block diagram of a method for searching for a target person according to some other embodiments of the present disclosure.

Based on the foregoing introduction of the embodiments of the present disclosure, the logic block diagram of the method for searching for a target person according to the embodiments of the present disclosure is as shown in FIG. 3. Video structuring operations (mainly including face/pedestrian detection processing and face/pedestrian tracking processing) are performed on a great number of videos (such as monitoring videos) in advance to obtain a face image library and a pedestrian image library. During search of an image of the target person including a face, face search is first performed on the face image library to obtain a first face image template, pedestrian search is performed on the first face image template based on the pedestrian image library to obtain several pedestrian image templates, then the several pedestrian image templates are filtered, and finally, a search result of the target person is obtained.

According to the embodiments of the present disclosure, a conjunction search strategy combining face search and pedestrian search is used, a face image library is first searched to obtain a first face image template matching an image of a target person, and then at least one target pedestrian image template matching the image of the target person is obtained based on a pedestrian image library and the first face image template. The embodiments of the present disclosure have the advantages of not only a long-time span and high precision of face search but also a high recall rate of pedestrian search, thereby improving the accuracy rate of searching for a target person.

Any method for searching for a target person provided in the embodiments of the present disclosure may be performed by any appropriate device having data processing capability, including, but not limited to, a terminal and a server, etc. Alternatively, any method for searching for a target person provided in the embodiments of the present disclosure may be performed by a processor, for example, any method for searching for a target person mentioned in the embodiments of the present disclosure is performed by the processor by invoking a corresponding instruction stored in a memory. Details are not described below repeatedly.

A person of ordinary skill in the art may understand that: all or some steps of implementing the forgoing embodiments of the method may be achieved by a program by instructing related hardware; the foregoing program may be stored in a computer-readable storage medium; when the program is executed, steps including the foregoing embodiments of the method are performed; moreover, the foregoing storage medium includes various media capable of storing program codes such as an ROM, an RAM, a magnetic disk, or an optical disk.

Figure 4:
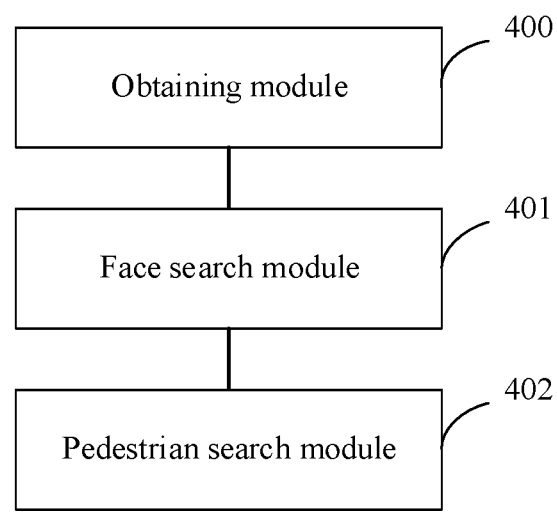
FIG. 4 is a structural block diagram of an apparatus for searching for a target person according to some embodiments of the present disclosure.

FIG. 4 is a structural block diagram of an apparatus for searching for a target person according to some embodiments of the present disclosure.

The apparatus for searching for a target person provided in the embodiments of the present disclosure includes: an obtaining module 400 configured to obtain an image of the target person; a face search module 401 configured to search a face image library by using the image of the target person obtained by the obtaining module 400 to obtain a first face image template matching the image of the target person, where the face image library includes a plurality of face image templates; and a pedestrian search module 402 configured to obtain, according to the first face image template found by the face search module 401 and a pedestrian image library, at least one target pedestrian image template matching the image of the target person, where the pedestrian image library includes a plurality of pedestrian image templates.

The apparatus for searching for a target person according to the embodiments of the present disclosure is configured to implement the corresponding method for searching for a target person according to the forgoing embodiments, and has the beneficial effects of the corresponding method embodiments. Details are not described herein repeatedly.

Figure 5:
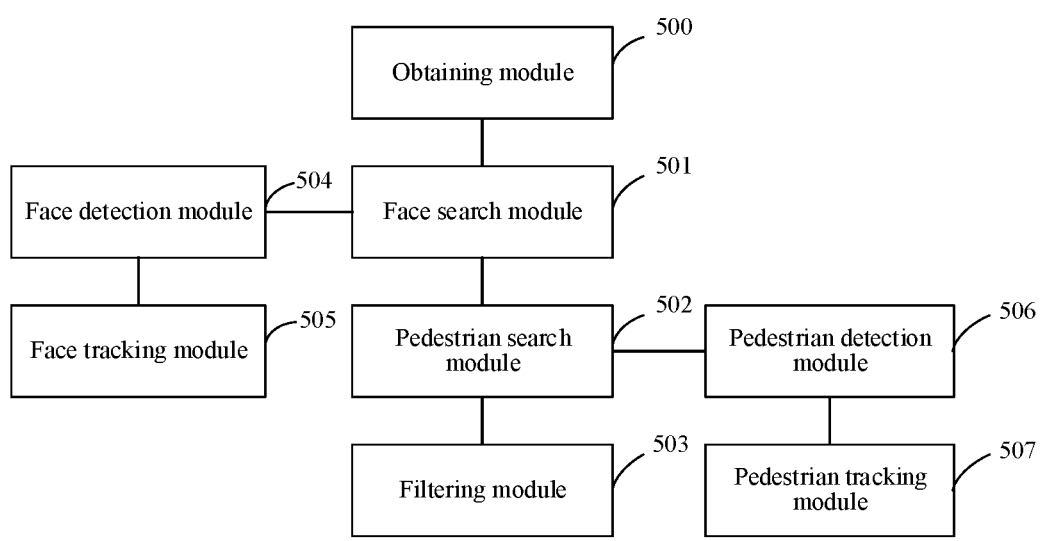
FIG. 5 is a structural block diagram of an apparatus for searching for a target person according to some other embodiments of the present disclosure.

FIG. 5 is a structural block diagram of an apparatus for searching for a target person according to some other embodiments of the present disclosure.

The apparatus for searching for a target person provided in the embodiments of the present disclosure includes: an obtaining module 500 configured to obtain an image of the target person; a face search module 501 configured to search a face image library by using the image of the target person obtained by the obtaining module 500 to obtain a first face image template matching the image of the target person, where the face image library includes a plurality of face image templates; and a pedestrian search module 502 configured to obtain, according to the first face image template found by the face search module 501 and a pedestrian image library, at least one target pedestrian image template matching the image of the target person, where the pedestrian image library includes a plurality of pedestrian image templates.

According to one or more embodiments of the disclosure, the face search module 501 is configured to: obtain first face feature data of the image of the target person; and determine, according to the first face feature data, a first face image template from a plurality of face image templates stored in a face image library.

According to one or more embodiments of the disclosure, the face search module 501 is configured to: determine the first face image template from the plurality of face image templates based on a distance between the first face feature data and each of a plurality of pieces of second face feature data corresponding to the plurality of face image templates.

According to one or more embodiments of the disclosure, the face search module 501 is configured to: determine at least one face image template, which corresponds to second face feature data with a minimum distance from the first face feature data among the plurality of pieces of second face feature data, as the first face image template; or determine at least one face image template, which corresponds to second face feature data with a distance less than or equal to a first threshold from the first face feature data among the plurality of pieces of second face feature data, as the first face image template.

According to one or more embodiments of the disclosure, at least two of the plurality of face image templates form a face track corresponding to a same person, and second face feature data corresponding to the at least two face image templates is average feature data of the face track formed by the at least two face image templates.

According to one or more embodiments of the disclosure, the pedestrian search module 502 is configured to: obtain a first pedestrian image corresponding to the first face image template; and search the pedestrian image library by using the first pedestrian image for at least one target pedestrian image template matching the image of the target person.

According to one or more embodiments of the disclosure, the pedestrian search module 502 is configured to: determine first pedestrian feature data of the first pedestrian image; and determine, according to the first pedestrian feature data, at least one pedestrian image template matching the first pedestrian image from the plurality of pedestrian image templates stored in the pedestrian image library, and determine the at least one pedestrian image template matching the first pedestrian image as the at least one target pedestrian image template matching the image of the target person.

According to one or more embodiments of the disclosure, the pedestrian search module 502 is configured to: determine at least one pedestrian image template matching the first pedestrian image from the plurality of pedestrian image templates based on a distance between the first pedestrian feature data and each of a plurality of pieces of second pedestrian feature data corresponding to the plurality of pedestrian image templates.

According to one or more embodiments of the disclosure, the pedestrian search module 502 is configured to: determine at least one pedestrian image template, which corresponds to second pedestrian feature data with a minimum distance from the first pedestrian feature data among the plurality of pieces of second pedestrian feature data, as the at least one pedestrian image template matching the first pedestrian image; or determine at least one pedestrian image template, which corresponds to second pedestrian feature data with a distance less than or equal to a second threshold from the first pedestrian feature data among the plurality of pieces of second pedestrian feature data, as the at least one pedestrian image template matching the first pedestrian image.

According to one or more embodiments of the disclosure, at least two of the plurality of pedestrian image templates form a pedestrian track corresponding to a same person, and second pedestrian feature data corresponding to the at least two pedestrian image templates is average feature data of the pedestrian track formed by the at least two pedestrian image templates.

According to one or more embodiments of the disclosure, the first face image template corresponds to a first face image, and the pedestrian search module 502 is configured to: determine a first video to which the first face image belongs as well as frame number information and image position information of the first face image; and obtain, according to the frame number information and the image position information of the first face image, a first pedestrian image corresponding to the first face image template from the first video.

According to one or more embodiments of the disclosure, the pedestrian search module 502 is configured to: if the first video includes a pedestrian image having a frame number of the pedestrian image corresponding to the frame number information of the first face image and includes the first face image, determine the pedestrian image including the first face image as the first pedestrian image corresponding to the first face image template.

According to one or more embodiments of the disclosure, the pedestrian search module 502 is configured to: if the first video does not include a pedestrian image which has a frame number of the pedestrian image corresponding to the frame number information of the first face image and includes the first face image, expand the first face image in the first video image with a preset proportion to obtain the first pedestrian image corresponding to the first face image template, where the frame number of the first video image in the first video corresponds to the frame number information of the first face image.

According to one or more embodiments of the disclosure, the apparatus for searching for a target person provided in the embodiments of the present disclosure further includes: a filtering module 503 configured to, after the pedestrian search module 502 obtains, according to the first face image template and a pedestrian image library, at least one target pedestrian image template matching the image of the target person, filter the at least one target pedestrian image template matching the image of the target person to obtain a search result of the target person.

According to one or more embodiments of the disclosure, the filtering module 503 is configured to: divide the at least one target pedestrian image template into at least one group of pedestrian image templates according to feature data of each of the at least one target pedestrian image template; determine filtering statistics data of each group of pedestrian image templates according to feature data of pedestrian images included in each of the at least one group of pedestrian image templates; and determine a pedestrian image corresponding to one or more of the at least one group of pedestrian image templates as a search result of the target person according to the filtering statistics data of each of the at least one group of pedestrian image templates.

According to one or more embodiments of the disclosure, the apparatus for searching for a target person provided in the embodiments of the present disclosure further includes: a face detection module 504 configured to, before the face search module 501 searches a face image library by using the image of the target person to obtain a first face image template matching the image of the target person, perform face detection processing on video images included in each of at least one video to obtain a plurality of face images; and store each of the plurality of face images and/or information of each face image in the face image library as a face image template, where the information of the face image includes at least one of the following: feature data of the face image, information of a video to which the face image belongs, frame number information of the face image, or position information of the face image in a video image.

According to one or more embodiments of the disclosure, the apparatus for searching for a target person provided in the embodiments of the present disclosure further includes: a face tracking module 505 configured to perform face tracking processing on the plurality of face images to obtain at least one face track, where each face track includes at least two of the plurality of face images; determine average feature data of each face track of the at least one face track according to the at least two face images included in the each face track; and store the average feature data of each of the at least one face track in the face image library.

According to one or more embodiments of the disclosure, the apparatus for searching for a target person provided in the embodiments of the present disclosure further includes: a pedestrian detection module 506 configured to, before the pedestrian search module 502 obtains, according to the first face image template and a pedestrian image library, at least one target pedestrian image template matching the image of the target person, perform dace detection processing on video images included in each of at least one video to obtain a plurality of pedestrian images; and store each of the plurality of pedestrian images and/or information of each pedestrian image in the pedestrian image library as a pedestrian image template, where the information of the pedestrian image includes at least one of the following: feature data of the pedestrian image, information of a video to which the pedestrian image belongs, frame number information of the pedestrian image, and position information of the pedestrian image in the video image.

According to one or more embodiments of the disclosure, the apparatus for searching for a target person provided in the embodiments of the present disclosure further includes: a pedestrian tracking module 507 configured to perform pedestrian tracking processing on the plurality of pedestrian images to obtain at least one pedestrian track, where each pedestrian track includes at least two of the plurality of pedestrian images; determine average feature data of each pedestrian track according to the at least two pedestrian images included in each of the at least one pedestrian track; and store the average feature data of each of the at least one pedestrian track in the pedestrian image library.

The apparatus for searching for a target person according to the embodiments of the present disclosure is configured to implement the corresponding method for searching for a target person according to the forgoing embodiments. The modules/units in the search apparatus may be configured to perform the steps in the forgoing method embodiments. For the purpose of brevity, details are not described herein repeatedly.

Figure 6:
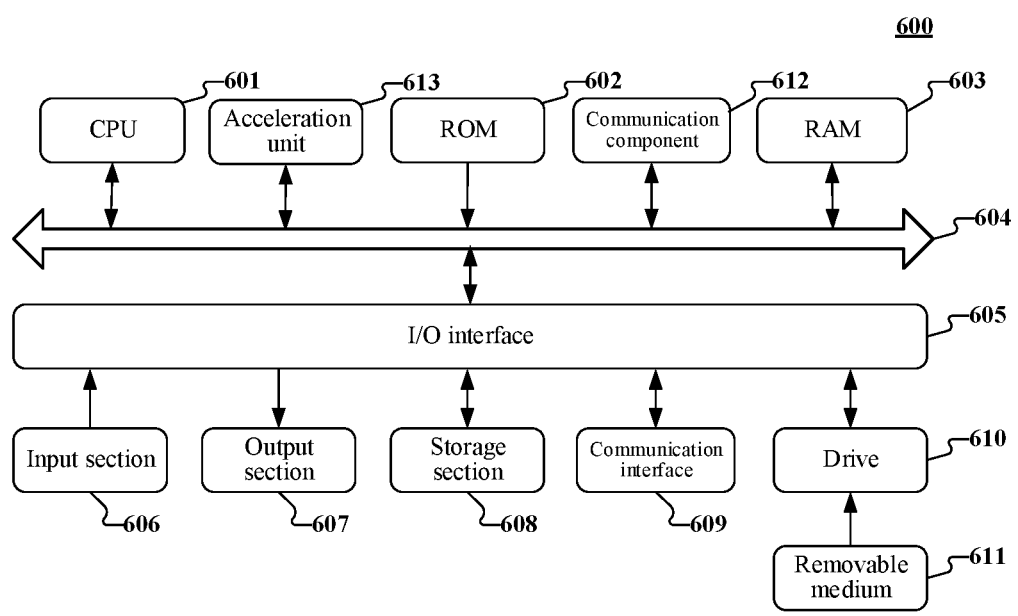
FIG. 6 is a schematic structural diagram of an electronic device according to some embodiments of the present disclosure.

The embodiments of the present disclosure further provide an electronic device which, for example, is a mobile terminal, a Personal Computer (PC), a tablet computer, a server, or the like. Referring to FIG. 6 below, FIG. 6 shows a schematic structural diagram of an electronic device 600 suitable for implementing the apparatus for searching for a target person according to the embodiments of the present disclosure. As shown in FIG. 6, the electronic device 600 includes a memory and a processor. According to one or more embodiments of the disclosure, the electronic device 600 includes one or more processors, a communication element, and the like. The one or more processors are, for example, one or more Central Processing Units (CPUs) 601, and/or one or more acceleration units 613, or the like. The acceleration unit 613 includes, but is not limited to, a GPU, an FPGA, and other type of special-purpose processor. The processor performs various appropriate actions and processing according to executable instructions stored in a Read-Only Memory (ROM) 602 or executable instructions loaded from a storage section 608 to a Random-Access Memory (RAM) 603. The communication element includes a communication component 612 and/or a communication interface 609. The communication component 612 includes, but is not limited to, a network card, and the network card includes, but is not limited to, an InfiniBand (IB) network card. The communication interface 609 includes a communication interface of a network interface card such as an LAN card and a modem, and the communication interface 609 performs communication processing via a network such as the Internet.

The processor may communicate with the ROM 602 and/or the RAM 603 to execute executable instructions, is connected to the communication component 612 via a communication bus 604, and communicates with other target devices via the communication component 612, so as to achieve corresponding operations of any method for searching for a target person provided in the embodiments of the present disclosure, for example, obtaining an image of the target person; searching a face image library by using the image of the target person to obtain a first face image template matching the image of the target person, where the face image library includes a plurality of face image templates; and obtaining, according to the first face image template and a pedestrian image library, at least one target pedestrian image template matching the image of the target person, where the pedestrian image library includes a plurality of pedestrian image templates.

In addition, the RAM 603 may further store various programs and data required for operations of an apparatus. The CPU 601 or the acceleration unit 613, the ROM 602, and the RAM 603 are connected to each other via the bus 604. In the presence of the RAM 603, the ROM 602 is an optional module. The RAM 603 stores executable instructions, or writes executable instructions to the ROM 602 during running, where the executable instructions cause the processor to perform corresponding operations of the foregoing method. An Input/output (I/O) interface 605 is also connected to the communication bus 604. The communication component 612 is integrated, or is configured to have a plurality of sub-modules (for example, a plurality of IB network cards) linked on the communication bus.

The following components are connected to the I/O interface 605: an input section 606 including a keyboard, a mouse and the like; an output section 607 including a Cathode-Ray Tube (CRT), a Liquid Crystal Display (LCD), a loudspeaker and the like; the storage section 608 including hardware and the like; and the communication interface 609 of a network interface card such as an LAN card and a modem. A drive 610 is also connected to the I/O interface 605 according to requirements. A removable medium 611 such as a magnetic disk, an optical disk, a magneto-optical disk, a semiconductor memory or the like is mounted on the drive 610 according to requirements, so that a computer program read from the removable medium is installed on the storage section 608 according to requirements.

It should be noted that, the architecture shown in FIG. 6 is merely an optional implementation. During specific practice, the number and types of the components in FIG. 6 may be selected, decreased, increased, or replaced according to actual requirements. Different functional components may be separated or integrated or the like. For example, the acceleration unit 613 and the CPU 601 may be separated, or the acceleration unit 613 may be integrated on the CPU 601, and the communication element may be separated from or integrated on the CPU 601 or the acceleration unit 613 or the like. These alternative implementations all fall within the scope of protection of the present disclosure.

The electronic device according to the embodiments of the present disclosure may be configured to implement the corresponding target operation search method in the foregoing embodiments. The components in the electronic device may be configured to perform the steps in the foregoing method embodiments. For example, the method for searching for a target person described above may be implemented by the processor of the electronic device invoking related instructions stored in the memory. For the purpose of brevity, details are not described herein repeatedly.

The process described above with reference to the flowchart according to the embodiments of the present disclosure may be implemented as a computer software program. For example, the embodiments of the present disclosure include a computer program product, including a computer program tangibly included on a machine-readable medium. The computer program includes a program code for performing the method shown in the flowchart. The program code may include corresponding instructions for correspondingly performing the steps of the method provided in the embodiments of the present disclosure, for example, obtaining an image of a target person; searching a face image library by using the image of the target person to obtain a first face image template matching the image of the target person, where the face image library includes a plurality of face image templates; and obtaining, according to the first face image template and a pedestrian image library, at least one target pedestrian image template matching the image of the target person, where the pedestrian image library includes a plurality of pedestrian image templates. In such embodiments, the computer program may be downloaded and installed from a network through the communication element and/or installed from the removable medium 611. When the computer program is executed by the processor, functions provided in the method according to the embodiments of the present disclosure are performed.

It should be noted that, description portions of the embodiments of the present disclosure all have their own focuses, and for portions that are not described exhaustively in one embodiment, refer to the introduction and description in other embodiments in the present disclosure. Details are not described repeatedly.

The methods, apparatuses, electronic devices, and storage media according to the present disclosure may be implemented in many manners. For example, the methods, apparatuses, electronic devices, and storage media according to the embodiments of the present disclosure may be implemented by using software, hardware, firmware, or any combination of software, hardware, and firmware. Unless otherwise specially stated, the foregoing sequences of steps of the methods are merely for description, and are not intended to limit the steps of the methods of the embodiments of the present disclosure. In addition, in some embodiments, the present disclosure may be implemented as programs recorded in a recording medium. The programs include machine-readable instructions for implementing the methods according to the embodiments of the present disclosure. Therefore, the present disclosure further covers the recording medium storing the programs for performing the methods according to the embodiments of the present disclosure.

The descriptions of the embodiments of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. A method for searching for a target person, comprising:
obtaining an image of the target person;
searching a face image library by using the image of the target person to obtain a first face image template matching the image of the target person, wherein the face image library comprises a plurality of face image templates; and
obtaining, according to the first face image template and a pedestrian image library, at least one target pedestrian image template matching the image of the target person, wherein the pedestrian image library comprises a plurality of pedestrian image templates.

2. The method according to claim 1, wherein the searching a face image library by using the image of the target person to obtain a first face image template matching the image of the target person comprises:
obtaining first face feature data of the image of the target person; and
determining, according to the first face feature data, the first face image template from the plurality of face image templates stored in the face image library.

3. The method according to claim 2, wherein the determining, according to the first face feature data, the first face image template from the plurality of face image templates stored in the face image library comprises:
determining the first face image template from the plurality of face image templates based on a distance between the first face feature data and each of a plurality of pieces of second face feature data corresponding to the plurality of face image templates.

4. The method according to claim 3, wherein the determining the first face image template from the plurality of face image templates based on a distance between the first face feature data and each of a plurality of pieces of second face feature data corresponding to the plurality of face image templates comprises:
determining at least one face image template, which corresponds to second face feature data with a minimum distance from the first face feature data among the plurality of pieces of second face feature data, as the first face image template; or
determining at least one face image template, which corresponds to second face feature data with a distance less than or equal to a first threshold from the first face feature data among the plurality of pieces of second face feature data, as the first face image template.

5. The method according to claim 3, wherein at least two of the plurality of face image templates form a face track corresponding to a same person, and second face feature data corresponding to the at least two face image templates is average feature data of the face track formed by the at least two face image templates.

6. The method according to claim 1, wherein the obtaining, according to the first face image template and a pedestrian image library, at least one target pedestrian image template matching the image of the target person comprises:
obtaining a first pedestrian image corresponding to the first face image template; and
searching the pedestrian image library by using the first pedestrian image to obtain the at least one target pedestrian image template matching the image of the target person.

7. The method according to claim 6, wherein the searching the pedestrian image library by using the first pedestrian image to obtain the at least one target pedestrian image template matching the image of the target person comprises:
determining first pedestrian feature data of the first pedestrian image;

determining, according to the first pedestrian feature data, at least one pedestrian image template matching the first pedestrian image from the plurality of pedestrian image templates stored in the pedestrian image library; and determining the at least one pedestrian image template matching the first pedestrian image as the target pedestrian image template.

8. The method according to claim 7, wherein the determining, according to the first pedestrian feature data, at least one pedestrian image template matching the first pedestrian image from the plurality of pedestrian image templates stored in the pedestrian image library comprises:

determining at least one pedestrian image template matching the first pedestrian image from the plurality of pedestrian image templates based on a distance between the first pedestrian feature data and each of a plurality of pieces of second pedestrian feature data corresponding to the plurality of pedestrian image templates.

9. The method according to claim 8, wherein the determining at least one pedestrian image template matching the first pedestrian image from the plurality of pedestrian image templates based on a distance between the first pedestrian feature data and each of a plurality of pieces of second pedestrian feature data corresponding to the plurality of pedestrian image templates comprises:

determining at least one pedestrian image template, which corresponds to second pedestrian feature data with a minimum distance from the first pedestrian feature data among the plurality of pieces of second pedestrian feature data, as at least one pedestrian image template matching the first pedestrian image; or determining at least one pedestrian image template, which corresponds to second pedestrian feature data with a distance less than or equal to a second threshold from the first pedestrian feature data among the plurality of pieces of second pedestrian feature data, as at least one pedestrian image template matching the first pedestrian image.

10. The method according to claim 8, wherein at least two of the plurality of pedestrian image templates form a pedestrian track corresponding to a same person, and second pedestrian feature data corresponding to the at least two pedestrian image templates is average feature data of the pedestrian track formed by the at least two pedestrian image templates.

11. The method according to claim 6, wherein the first face image template corresponds to a first face image; and the obtaining a first pedestrian image corresponding to the first face image template comprises:

determining a first video to which the first face image belongs as well as frame number information and image position information of the first face image; and obtaining a first pedestrian image corresponding to the first face image template from the first video according to the frame number information and the image position information of the first face image.

12. The method according to claim 11, wherein the obtaining a first pedestrian image corresponding to the first face image template from the first video according to the frame number information and the image position information of the first face image comprises at least one of:

if the first video comprises a pedestrian image having a frame number which corresponds to the frame number information of the first face image and comprising the first face image, determining the pedestrian image comprising the first face image as a first pedestrian image corresponding to the first face image template; or if the first video does not comprise a pedestrian image having a frame number which corresponds to the frame number information of the first face image and comprising the first face image, expanding the first face image in a first video image according to a preset proportion to obtain a first pedestrian image corresponding to the first face image template, wherein the frame number of the first video image in the first video corresponds to the frame number information of the first face image.

13. The method according to claim 1, wherein after the obtaining, according to the first face image template and a pedestrian image library, at least one target pedestrian image template matching the image of the target person, the method further comprises:

filtering the at least one target pedestrian image template to obtain a search result of the target person.

14. The method according to 13, wherein the filtering the at least one target pedestrian image template to obtain a search result of the target person comprises:

dividing the at least one target pedestrian image template into at least one group of pedestrian image templates according to feature data of each of the at least one target pedestrian image template;

determining filtering statistics data of each group of pedestrian image templates according to feature data of pedestrian images comprised in each of the at least one group of pedestrian image templates; and determining a pedestrian image corresponding to one or more of the at least one group of pedestrian image templates as a search result of the target person according to the filtering statistics data of each of the at least one group of pedestrian image templates.

15. The method according to claim 1, wherein before the searching a face image library by using the image of the target person to obtain a first face image template matching the image of the target person, the method further comprises:

performing face detection processing on video images comprised in each of at least one video to obtain a plurality of face images; and storing each of the plurality of face images and/or information of each face image in the face image library as a face image template, wherein the information of the face image comprises at least one of the following: feature data of the face image, information of a video to which the face image belongs, frame number information of the face image, or position information of the face image in a video image.

16. The method according to claim 15, further comprising:

performing face tracking processing on the plurality of face images to obtain at least one face track, where each face track comprises at least two of the plurality of face images;

determining average feature data of each face track of the at least one face track according to the at least two face images comprised in the each face track; and storing the average feature data of each of the at least one face track in the face image library.

17. The method according to claim 1, wherein before the obtaining, according to the first face image template and a pedestrian image library, at least one target pedestrian image template matching the image of the target person, the method further comprises:

performing dace detection processing on video images comprised in each of at least one video to obtain a plurality of pedestrian images; and storing each of the plurality of pedestrian images and/or information of each pedestrian image in the pedestrian image library as a pedestrian image template, wherein the information of the pedestrian image comprises at least one of the following: feature data of the pedestrian image, information of a video to which the pedestrian image belongs, frame number information of the pedestrian image, and position information of the pedestrian image in the video image.

18. The method according to claim 17, further comprising:

performing pedestrian tracking processing on the plurality of pedestrian images to obtain at least one pedestrian track, wherein each pedestrian track comprises at least two of the plurality of pedestrian images;

determining average feature data of each pedestrian track of the at least one pedestrian track according to the at least two pedestrian images comprised in the each pedestrian track; and storing the average feature data of each of the at least one pedestrian track in the pedestrian image library.

19. An apparatus for searching for a target person, comprising:

a processor; and a memory for storing instructions executable by the processor, wherein execution of the instructions by the processor causes the processor to implement operations, the operations comprising:

obtaining an image of the target person;

searching a face image library by using the image of the target person to obtain a first face image template matching the image of the target person, wherein the face image library comprises a plurality of face image templates; and obtaining, according to the first face image template and a pedestrian image library, at least one target pedestrian image template matching the image of the target person, wherein the pedestrian image library comprises a plurality of pedestrian image templates.

20. A non-transitory computer storage medium, having computer-readable instructions stored thereon, wherein execution of the computer-readable instructions by a processor causes the processor to implement operation of:

obtaining an image of the target person;

searching a face image library by using the image of the target person to obtain a first face image template matching the image of the target person, wherein the face image library comprises a plurality of face image templates; and obtaining, according to the first face image template and a pedestrian image library, at least one target pedestrian image template matching the image of the target person, wherein the pedestrian image library comprises a plurality of pedestrian image templates.

* * * * *